Aug. 30, 1966 R. L. TIEDE 3,269,818
DEVITRIFYING A GLASS ABOUT GLASS FIBERS ON A CONDUCTOR
Original Filed Aug. 23, 1960

INVENTOR.
RALPH L. TIEDE
BY
ATTORNEYS

United States Patent Office 3,269,818
Patented August 30, 1966

3,269,818
DEVITRIFYING A GLASS ABOUT GLASS FIBERS ON A CONDUCTOR
Ralph L. Tiede, Newark, Ohio, assignor to Owens-Corning Fiberglas Corporation, a corporation of Delaware
Original application Aug. 23, 1960, Ser. No. 51,351, now Patent No. 3,179,739, dated Apr. 20, 1965. Divided and this application Oct. 29, 1964, Ser. No. 407,429
4 Claims. (Cl. 65—43)

This is a division of my co-pending application Serial No. 51,351, filed August 23, 1960, now U.S. Patent No. 3,179,739, issued April 20, 1965.

This invention relates to glass insulation of electrical conductors and particularly to such insulation formed by fusing elements of glass applied in adjoining association upon the electrical conductor.

More particularly the invention relates to a glass composition especially adapted for being a fused component of such insulation.

Fibrous glass has been used for many years as an insulating covering for electrical conductors. Being inorganic, glass fibers are resistant to moisture, corrosion, heat and flame; in addition, they possess great tensile strength and excellent electrical properties such as non-conductiveness, low space factor, high dielectric strength and high insulation resistance. Where high strength is required, glass filaments permit the use of thinner coatings without sacrificing mechanical strength. Typical examples are electric motors, the size of which have been greatly reduced with the development of glass fibers.

Glass insulated wire as made heretofore has certain disadvantages which have limited its use. The organic impregnant or bonding agent combined with the glass elements softens or embrittles under high temperature operation. Carbonization of the organic binder under heat allows tracking, shorts and hot spots.

Failure of such insulation is also caused over a period of time by corona stress which effects ionic bombardment within microvoids and through continued enlargement of the cavities causes a final break in the insulation. The binders also add appreciable bulk to the insulation and thereby detract from the space saving attribute of the glass elements.

Accordingly, it is a prime object of this invention to provide an insulation for electrical conductors free of organic substances and thereby having an improved space factor and being capable of withstanding higher temperatures without disintegration or impairment.

A more specific object of this invention is the provision of insulation for electrical conductors which is able to perform satisfactorily through a range of temperatures from $-100$ to $+950°$ F.

Another object of the invention is to provide a glass composition of a fiberizable nature and of excellent electrical properties, and which fuses at a comparatively low temperature.

A further object is the provision of glass insulation created by consolidating two different glass elements by fusing one only of the elements.

An additional object of the invention is to provide an insulation for an electrical conductor by wrapping the conductor with fibrous glass strands of different compositions and then fusing the strands of one of the compositions.

A still further object of the invention is to utilize a glass composition for insulating purposes which is fusible and which may then be devitrified to raise the temperature to which the glass must be brought before again being fused.

These and other objects of the invention are attained primarily through the use of a new glass composition having a unique combination of properties. The latter include a fusing temperature in the neighborhood of $1000°$ F., a comparatively flat viscosity-versus-temperature curve in the zone of viscosity at which the glass may be attenuated into fibers, a low liquidus temperature, good electrical properties, and thermal expansion compatible with that of copper.

The practice of the invention further involves combining, under fusion, elements of the new glass composition with unfused glass elements of a composition having a higher melting temperature.

In following the concepts of the invention, glass strands or yarn may be wound upon a conductor and then completely fused, or such strands may be consolidated by fusing only certain low melting strand or filament components thereof. Another method of practising the invention comprises applying a layer of glass strands or yarns of a high melting nature and fusing thereto an overlying coating of glass elements in fibrous or particulate form. Still other procedures encompassed by the invention will be described hereinafter.

A suitable and a preferred glass composition for the elements to be fused according to my invention lies within the following range of ingredients expressed in weight percent:

TABLE A

| Ingredients: | Proportion |
|---|---|
| $SiO_2$ | 25 to 30 |
| CaO | 3 to 5 |
| $Na_2O$ | 10 to 20 |
| $B_2O_3$ | 20 to 30 |
| $CaF_2$ | 6 to 12 |
| ZnO | 0 to 7 |
| RO | 14 to 20 |

In the above composition RO represents one, or any combination of the oxides of Sr, Ba and Pb.

Fluorine may be added to the batch in other forms than fluorspar ($CaF_2$). However, the latter is readily available and of low cost.

The following examples are two of the specific compositions within the preferred range of Table A which have been prepared and utilized.

Example 1

| Ingredients: | Proportion |
|---|---|
| $SiO_2$ | 28.7 |
| CaO | 4.5 |
| $Na_2O$ | 11.7 |
| $B_2O_3$ | 26.3 |
| $CaF_2$ | 6.4 |
| ZnO | 5.3 |
| BaO | 17.2 |

Example 2

| Ingredients: | Proportion |
|---|---|
| $SiO_2$ | 28.7 |
| CaO | 4.5 |
| $Na_2O$ | 11.4 |
| $B_2O_3$ | 26.3 |
| $CaF_2$ | 11.9 |
| SrO | 17.2 |

These glasses have a liquidus temperature close to $1360°$ F., a viscosity of 1000 poises at a temperature of approximately $1450°$ F., and a Littleton softening point between $1119°$ and $1134°$ F. Their coefficient of expansion times $10^7$ is 50.5 from $70°$ to $304.9°$ F.

In one aspect of my invention fibrous glass elements of a high melting temperature are joined together in a hermetical insulating coating by forming a matrix through fusing a low melting glass coming within the composition range of Table A.

The high melting glass component contributes additional strength, electrical properties and heat resistance to the insulation. A suitable composition for such glasses is disclosed in U.S. Patent 2,334,961 issued to Schoenlaub.

A specific example thereof has the following combination of ingredients by weight.

*Example 3*

| Ingredients: | Proportion |
|---|---|
| CaO | 17.5 |
| MgO | 4.5 |
| $Al_2O_3$ | 14.0 |
| $SiO_2$ | 54.0 |
| $B_2O_3$ | 10.0 |

This glass has a fiber drawing range in the neighborhood of 2000 to 2400° F., a liquidus temperature of 2040° F., a coefficient of expansion of $28 \times 10^{-7}$ per degree F., a Littleton softening point at 1555° F., and resistance in the order of 410 megohms.

A supplemental facet of this invention involves the fusing of a glass insulation upon an electrical conductor and then devitrifying the fusing glass component to raise the temperature at which it would thereafter soften under elevated service temperatures. The devitrification creates a relatively rigid crystalline skeleton or phase substantially harder and able to withstand higher temperatures without deforming the original glass.

Devitrification is secured by maintaining the glass for a sufficient period at the devitrification temperature which preferably corresponds to the sealing temperature.

The following is a composition of a devitrifiable glass, suitable for the purpose set forth, with the ingredients proportioned by weight percent:

*Example 4*

| Ingredients: | Proportion |
|---|---|
| PbO | 75 |
| ZnO | 10 |
| $B_2O_3$ | 10 |
| $Al_2O_3$ | 2 |
| $SiO_2$ | 3 |

This glass is fusible at a temperature between 790 and 840° F. and if held at the fusing or somewhat higher temperature, devitrification will occur. The resulting crystallization raises the temperature at which the glass must subsequently be brought before it will again flow. This new fusing temperature will be proportionately higher the more the crystallization is advanced under devitrifying heating. This glass composition has a coefficient of expansion in the region of $55 \times 10^{-7}$ per degree F.

A number of the various procedures which may be followed in practising the invention are illustrated in the drawings, in which.

Figure 1:
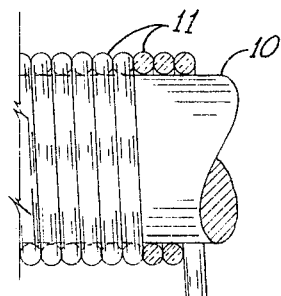
FIGURE 1 is a fragmentary view of an electrical conductor with a glass yarn wound thereon.

Referring to the drawings in more detail, the electrical conductor 10 may be considered as being a #20 copper wire having a diameter of 0.0320 of an inch. As shown in FIGURE 1, the yarn 11 wrapped around the conductor 10 is of fibrous glass drawn from a batch with a composition according to Example 1. This fibrous glass yarn is preferably created by plying strands composed of continuous glass filaments between twenty one and twenty five hundred thousandths of an inch in diameter. The strands contain several hundred filaments and are forty-five thousand yards in length per pound.

Figure 2:
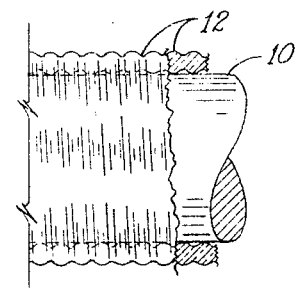
FIGURE 2 is a like view after the yarn of FIGURE 1 has been submitted to a fusing temperature.

Should the conductor 10 be intended for a magneto, motor or other electrical device in which it may be tightly wound, such winding, if feasible, should be performed just after the conductor is wrapped. Then heat is applied to melt the glass yarn 11 and transform it into a fused, hermetically sealed coating 12 as depicted in FIGURE 2. To inhibit undue oxidation of the copper conductor the application of heat is effected in a nitrogen atmosphere. For protection against oxidation during the glass fusing step and under high temperature service conditions, the copper wire may be clad with nickel or stainless steel.

The glass yarn 11 may alternately include with the fusible fibrous glass, strands or filaments of a higher melting glass composition on the order of that of Example 3. Strands of each type would be plied together to create the yarn or the strands could include a mixture of filaments of the two glass compositions.

Figure 3:
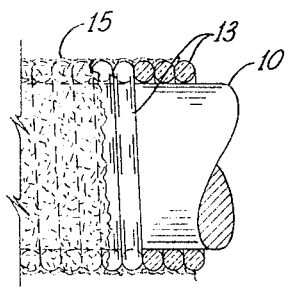
FIGURE 3 is a similar showing of a conductor covered by a winding of glass yarn with a coating of glass particles applied thereover.
Figure 4:
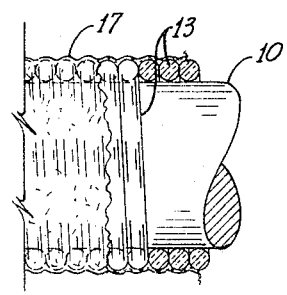
FIGURE 4 shows the assembly of FIGURE 3 following the fusing of the glass particles.

In another form of the invention, as shown in FIGURE 3, a yarn 13 of a high melting glass composition such as that of Example 3 is applied to an electrical conductor 10. Over the yarn is placed a coating 15 of particles of a glass fusible at a comparatively low temperature such as that of Example 1. This coating may be in flake or powder form and may be deposited from a water slurry by dip coating. The slurry may be composed of one hundred parts by weight of the glass particles to forty parts of water or a combination of water and ethyl alcohol. To help maintain the glass particles in suspension the slurry may have electrolytic constituents, such as monobasic sodium phosphate, to the extent of one or two parts by weight.

The coated conductor is then subjected to a temperature around 1100° F. for a sufficient period to melt the glass particles and to allow the molten glass to flow into and seal the spaces between the turns of the yarns around the conductor. In case the heating period is extended it is particularly desirable to provide an encompassing inert atmosphere.

Figure 5:
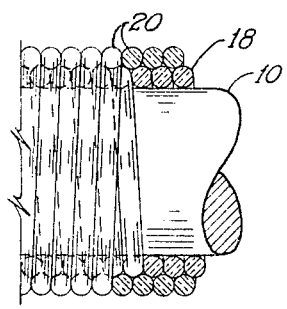
FIGURE 5 is a fragmentary illustration of an electrical conductor with two layers of glass yarn wound thereover.
Figure 6:
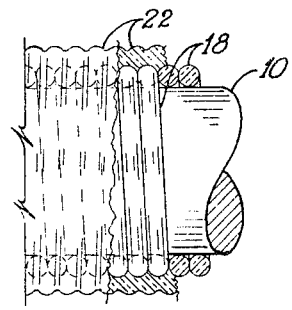
FIGURE 6 is a view of the conductor of FIGURE 5 after fusing of the outer layer of glass yarn.

In FIGURE 5 is shown a conductor 10 with a primary wrap 18 of glass yarn of a high melting composition and an outer secondary wrap 20 of glass yarn fusible at a comparatively low temperature. The yarn utilized in the layer 18 may be of the composition of Example 3 while the overlying wrap 20 may be of the composition of Example 1. Under application of sufficient heat the glass yarn 20 fuses and forms the continuous hermetic shielding layer 22 as indicated in FIGURE 6.

In the preceding exemplifications the fusible glass has been utilized as the only component or as one of the components (strands or filaments) of glass yarn wound upon a conductor; as a particulate material applied over a high melting glass wrap; and as a secondary outer layer of yarn.

Other alternate arrangements encompassed by the invention place the fusible yarn or fusible glass particles immediately upon the conductor with the high melting glass elements superimposed thereon. This would simply involve the reversing of the layers of elements as depicted in FIGURES 3 to 6. Also, the yarn of high melting glass may be passed through a bath of a slurry of glass particles of a more easily fused nature instead of applying the slurry to a bare conductor or to one wrapped with glass yarn.

A supplemental feature of the invention is the devitrification of the fused glass components whereby the temperature at which it may be subsequently softened is raised above that at which it is fused. A devitrifiable glass with the proper properties may be substituted for the low temperature fusible glasses employed in the preceding methods.

For this purpose a glass composition such as set forth in Example 4 would be employed. Being meltable and finable at a lower temperature a considerable saving in time would be secured through such a devitrifiable glass. In case a certain devitrifiable glass is not of a fiberizable nature it would then be used only in a particulate state and applied from a slurry.

While this invention is directed to providing a glass insulation, it is recognized that problems such as that of abrasion may require the application of an organic coating over the glass insulating base.

Various modifications and substitutions may be made in the disclosed embodiments of this invention within the spirit and scope of the appended claims.

I claim:

1. A method of applying a high temperature glass insulation to an electrical conductor which comprises coating the conductor with two layers of glass, one of said layers being of fibrous glass in strand form wrapped around the conductor, the other layer being of glass particles, the composition of the fibrous glass in strand form being fusible at a higher temperature than the composition of the glass particles, the composition of the glass particles being devitrifiable by a continued application of heat after the glass composition is fused, submitting the coated conductor to heat at a temperature high enough to fuse the glass particles into a continuous coating and continuing the application of heat to devitrify the glass particles at a temperature below that at which the fibrous glass in strand form is fused.

2. A method according to claim 1 in which the glass particles are of flake form and are deposited upon the conductor from a water slurry.

3. A method according to claim 1 in which the glass particles are in powder form and are deposited upon the conductor from a water slurry.

4. A method of applying a glass insulation to an electrical conductor which comprises wrapping the conductor with a first layer of fibrous glass strands, applying a second layer of glass particles over the strands of the first layer, the composition of the fibrous glass strands having a higher fusible temperature than the composition of glass particles, then applying heat to the conductor at a temperature high enough to fuse only the glass particles leaving the fibrous glass strands unfused, the glass particles being sufficiently fused to form a continuous coating, and continuing the application of heat to effect devitrification of the fused glass particles.

References Cited by the Examiner

UNITED STATES PATENTS

| 2,526,870 | 10/1950 | Jelinek et al. | 65—33 X |
| 2,639,247 | 5/1953 | Squier | 156—280 X |
| 2,889,952 | 6/1959 | Claypoole | 65—59 X |
| 3,012,092 | 12/1961 | Whearley et al. | 156—53 X |
| 3,030,257 | 4/1962 | Whearley et al. | 156—52 |

FOREIGN PATENTS 256,188  6/1926  Great Britain.

OTHER REFERENCES

Handbook of Glass Manufacture: volume II, by Fay V. Tooley, published by Ogden Publishing Co., New York, New York, 1960, pages 192 to 199.

DONALL H. SYLVESTER, *Primary Examiner.*

F. W. MIGA, *Assistant Examiner.*